US011057454B2

(12) United States Patent
Morgan et al.

(10) Patent No.: US 11,057,454 B2
(45) Date of Patent: Jul. 6, 2021

(54) METHODS AND SYSTEMS FOR IDENTIFYING AND REMEDIATING POOR USER EXPERIENCES ON COMPUTING DEVICES

(71) Applicant: Walmart Apollo, LLC, Bentonville, AR (US)

(72) Inventors: Bryan Duane Morgan, Ramona, CA (US); Vinay Kumar Yaragani, Redwood City, CA (US); Ah-Hyun Cho, San Francisco, CA (US); Ateeque Patel, Redwood City, CA (US); Srikanth Dasaka, Campbell, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/700,111

(22) Filed: Dec. 2, 2019

(65) Prior Publication Data
US 2021/0168193 A1 Jun. 3, 2021

(51) Int. Cl.
*H04L 29/08* (2006.01)

(52) U.S. Cl.
CPC .............. *H04L 67/04* (2013.01); *H04L 67/02* (2013.01); *H04L 67/303* (2013.01); *H04L 67/18* (2013.01)

(58) Field of Classification Search
CPC ....... H04L 67/04; H04L 67/02; H04L 67/303; H04L 67/18
See application file for complete search history.

(56) References Cited

U.S. PATENT DOCUMENTS

| 7,818,355 | B2 | 10/2010 | Mills et al. |
| 8,775,662 | B2 | 7/2014 | Yang et al. |
| 9,137,300 | B1* | 9/2015 | Marshall ............... H04L 65/602 |
| 9,473,812 | B2 | 10/2016 | Hosur |
| 9,714,832 | B2* | 7/2017 | Bailiang ................ G01C 21/26 |
| 10,182,013 | B1 | 1/2019 | Amdahl |
| 10,511,646 | B2 | 12/2019 | Hosur |
| 10,542,423 | B1 | 1/2020 | Chang et al. |
| 2004/0117455 | A1* | 6/2004 | Kaminsky ............... H04L 69/14 709/214 |
| 2012/0198335 | A1* | 8/2012 | Huang ................ G06F 16/9535 715/716 |
| 2013/0326137 | A1* | 12/2013 | Bilange ................. H04L 67/289 711/113 |

(Continued)

*Primary Examiner* — Arvin Eskandarnia
(74) *Attorney, Agent, or Firm* — Duane Morris LLP; Manita Rawat

(57) ABSTRACT

This application relates to apparatus and methods for identifying and remediating poor user experiences on computing devices. In some examples, a user speed determination device is configured to receive a content delivery request for delivery of content to a user device. The computing is also configured to obtain user identification data, obtain user device data and determine a user device speed based on the user identification data and the user device data. The computing device then sends a user device speed indicator to a content delivery device to cause the content delivery device to deliver remediated content to the user device when the user device speed is determined to be less than a predetermined speed threshold. The user identification data can include an IP address and the user device data can include user agent data, user connection data and user resource timing data.

17 Claims, 7 Drawing Sheets

(56) References Cited

U.S. PATENT DOCUMENTS

| | | | |
|---|---|---|---|
| 2014/0344338 A1* | 11/2014 | Feng | G06F 16/9535 |
| | | | 709/203 |
| 2015/0003264 A1* | 1/2015 | Ma | H04L 65/80 |
| | | | 370/252 |
| 2017/0150307 A1* | 5/2017 | Himmelreich | G08G 1/056 |
| 2018/0338033 A1* | 11/2018 | Boule | G01S 19/52 |
| 2019/0098442 A1* | 3/2019 | Marsh | G01S 5/0263 |
| 2019/0287138 A1* | 9/2019 | Buchalter | G06Q 30/0277 |
| 2019/0325670 A1* | 10/2019 | Tong | G07C 5/008 |
| 2020/0112767 A1* | 4/2020 | DeMerchant | H04N 21/44231 |

* cited by examiner

METHODS AND SYSTEMS FOR IDENTIFYING AND REMEDIATING POOR USER EXPERIENCES ON COMPUTING DEVICES

TECHNICAL FIELD

The disclosure relates generally to identifying and remediating poor user experiences on computing devices and, more specifically, to automatically identifying and remediating a poor user experience on a computing device due to a slow user computing device.

BACKGROUND

At least some websites, such as retailer websites, deliver content to users over a network. Such users may be using a variety of different devices, operating systems, software platforms and other variables that may affect the manner and speed at which content is delivered and communicated to the user. In addition, the user may be connected to the network via different communication protocols, connection types, network service providers, and from different geographical locations that can also affect the manner and speed at which content is delivered and communicated to the user. For example, a user that may access a website via a laptop computer connected to the network via a WiFi® connection will have a different experience on the website than a user connected to the network using an outdated mobile telephone via a 3G connection.

In the latter case described above, the user on the mobile telephone using a 3G connection may have a poor user experience. Such poor user experience may be characterized by an unacceptable amount of time to load the content for display to the user. In such instances of poor user experiences, the user may choose not to wait for the content to load. In instances in which the website is operated by a retailer or other commercial entity presenting products and/or services to the user, the poor user experience can result in negative customer experiences and/or potential sales losses for the retailer or other commercial entity. As such, there are opportunities to address such poor user experiences to minimize negative customer experiences and potential sales losses.

SUMMARY

The embodiments described herein are directed to automatically identifying and remediating poor user experiences on user devices. In some embodiments, the embodiments described herein can identify a user with a slow user device and deliver remediated content to the user after such identification has occurred. For example, some systems and computing devices described herein can obtain data about the user device and/or the user's connection to a network that can be used to identify whether the user has a slow user device. Upon such identification, the systems and computing devices described herein can cause remediated content to be delivered to the user device. The remediated content can be customized or otherwise bundled such that the remediated content performs and/or displays in a satisfactory manner on the user device.

For example, a user may be connected to a network using a mobile device via a cellular network. The mobile device and/or the cellular network may cause data from a website to load to the mobile device at unacceptable speeds such that the user may terminate the connection to the website rather than wait for the website content to load. The example systems and computing devices of the present disclosure can identify when such condition exists and deliver, for example, a "simpler" version of the website that can load faster than the standard version of the website. As a result, the user will remain engaged with the website since the website is able to load faster than would otherwise normally occur on the user's "slow" device. The user may then make a purchase that would otherwise not have occurred or may have a higher degree of customer satisfaction when engaged with the website. In addition to or instead of these example advantages, persons of ordinary skill in the art would recognize and appreciate other advantages as well.

In accordance with various embodiments, exemplary systems may be implemented in any suitable hardware or hardware and software, such as in any suitable computing device. For example, in some embodiments, a computing device may be configured to receive a content delivery request for delivery of content to a user device. The computing may also be configured to obtain user identification data, obtain user device data and determine a user device speed based on the user identification data and the user device data. The computing device may then send a user device speed indicator to a content delivery device to cause the content delivery device to deliver remediated content to the user device when the user device speed is determined to be less than a predetermined speed threshold. In some examples, the user identification data comprises an IP address and the user device data comprises user agent data, user connection data and user resource timing data.

In some embodiments, a method is provided that may include receiving a content delivery request for delivery of content to a user device. The method may also include obtaining user identification data, obtaining user device data and determining a user device speed based on the user identification data and the user device data. The method may further include sending a user device speed indicator to a content delivery device to cause the content delivery device to deliver remediated content to the user device when the user device speed is determined to be less than a predetermined speed threshold. In some examples, the user identification data comprises an IP address and the user device data comprises user agent data, user connection data and user resource timing data.

In yet other embodiments, a non-transitory computer readable medium has instructions stored thereon, where the instructions, when executed by at least one processor, may cause a computing device to perform operations that include receiving a content delivery request for delivery of content to a user device. The instruction, when executed by the at least one processor, may cause the computing device to perform operations that include obtaining user identification data, obtaining user device data and determining user device speed based on the user identification data and the user device data. The operations may also include sending a user device speed indicator to a content delivery device to cause the content delivery device to deliver remediated content to the user device when the user device speed is determined to be less than a predetermined speed threshold. In some examples, the user identification data comprises an IP address and user agent data and the user device data comprises user agent data, user connection data and user resource timing data.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
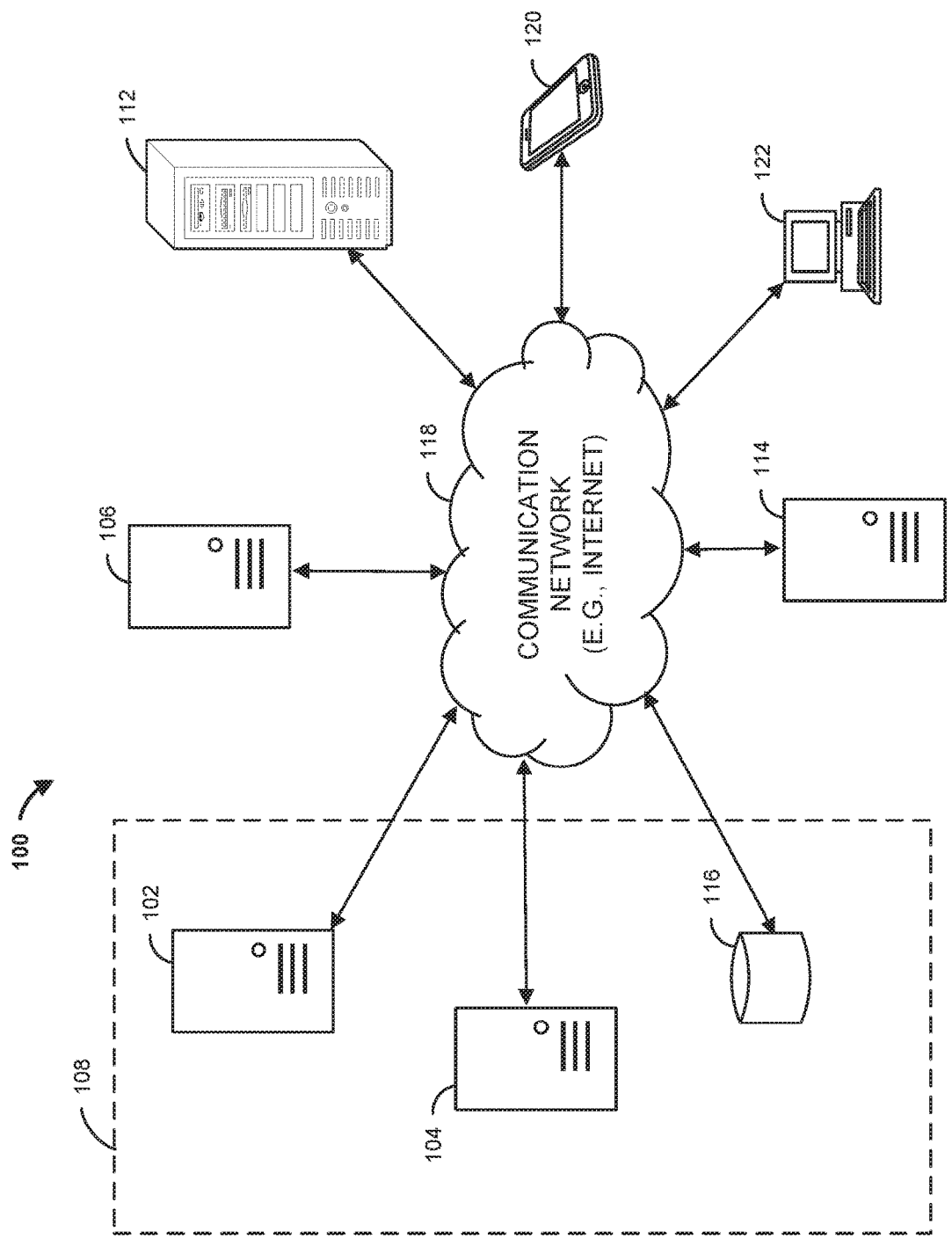
FIG. 1 is a block diagram of a network system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 illustrates a block diagram of a network system 100 that can include a user speed remediation system 108, multiple web servers 106, 114 and multiple computing devices 112, 120, 122. The user speed remediation system 108 can include a user speed determination device 102, a content delivery device 104 and a database 116. Each of the foregoing can be operatively coupled to each other over a network 118. User speed remediation device 102, content delivery device 104, web servers 106, 114, and multiple user computing devices 112, 120, 122 can each be any suitable computing device that includes any hardware or hardware and software combination for processing and handling information. In addition, each can transmit data to, and receive data from, communication network 118.

For example, user speed remediation device 102 can be a computer, a workstation, a laptop, a server such as a cloud-based server, or any other suitable device. Each of multiple user computing devices 112, 120, 122 can be a personal computing device such as a cellular phone, a laptop, a computer, a smartphone, a tablet, a personal assistant device, a voice assistant device, a digital assistant, or any other suitable device.

Additionally, each of the user speed remediation device 102, content delivery device 104, web servers 106, 114, and multiple user computing devices 112, 120, 122 can include one or more processors, one or more field-programmable gate arrays (FPGAs), one or more application-specific integrated circuits (ASICs), one or more state machines, digital circuitry, or any other suitable circuitry.

Although FIG. 1 illustrates three customer computing devices 112, 120, 122, network system 100 can include any number of customer computing devices 112, 120, 122. Similarly, user speed remediation system 108 can include any number of devices 102, 104 or any number of databases 116.

User speed remediation device 102 is operable to communicate with database 116 over communication network 118. For example, user speed remediation device 102 can store data to, and read data from, database 116. Database 116 can be a remote storage device, such as a cloud-based server, a memory device on another application server, a networked computer, or any other suitable remote storage. Although shown remote to user speed remediation device 102, in some examples, database 116 can be a local storage device, such as a hard drive, a non-volatile memory, or a USB stick.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network.

Communication network 118 can provide access to, for example, the Internet.

As illustrated in FIG. 1, the network system may include the web servers 106, 114. The web servers 106, 114 may be operated by a third-party service provider that may collect, store and transmit data regarding a user or user device to the user speed remediation system 108. For example, the web servers 106, 114 may be operated by a third-party service provider that collects and transmits or stores for retrieval user identification data and/or user device data. Such data, as will be described in further detail below, can be used by the user speed remediation device 102 to determine a user device speed. In some examples, any suitable known third party service provider can be used.

Figure 2:
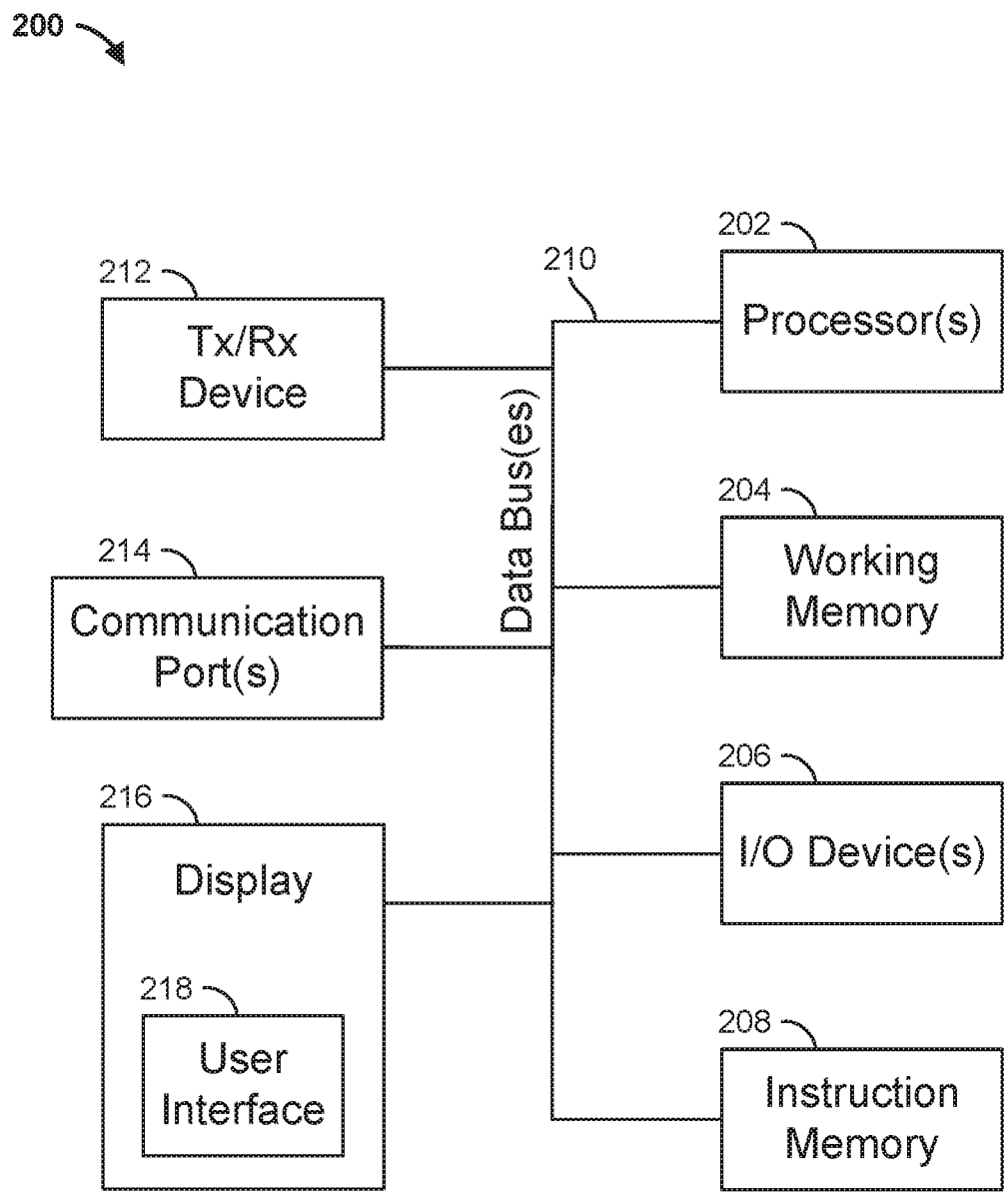
FIG. 2 is a block diagram of a user speed determination device of the network system of FIG. 1 in accordance with some embodiments.

FIG. 2 illustrates an example computing device 200. The user speed determination device 102, the content delivery device 104, the user computing device 112, the mobile user computing device 120 or the user computing device 122 may include the features shown in FIG. 2. For the sake of brevity, FIG. 2 is described relative to the user speed determination device 102. It should be appreciated, however, that the elements described can be included, as applicable, in the user computing device 112, the mobile user computing device 120 and the user computing device 122 As shown, the user speed determination device 102 can be a computing device 200 that may include one or more processors 202, working memory 204, one or more input/output devices 206, instruction memory 208, a transceiver 212, one or more communication ports 214, and a display 216, all operatively coupled to one or more data buses 210. Data buses 210 allow for communication among the various devices. Data buses 210 can include wired, or wireless, communication channels.

Processors 202 can include one or more distinct processors, each having one or more cores. Each of the distinct processors can have the same or different structure. Processors 202 can include one or more central processing units (CPUs), one or more graphics processing units (GPUs), application specific integrated circuits (ASICs), digital signal processors (DSPs), and the like.

Processors 202 can be configured to perform a certain function or operation by executing code, stored on instruction memory 208, embodying the function or operation. For example, processors 202 can be configured to perform one or more of any function, method, or operation disclosed herein.

Instruction memory 208 can store instructions that can be accessed (e.g., read) and executed by processors 202. For example, instruction memory 208 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 202 can store data to, and read data from, working memory 204. For example, processors 202 can store a working set of instructions to working memory 204, such as instructions loaded from instruction memory 208. Processors 202 can also use working memory 204 to store dynamic data created during the operation of user speed determination device 102. Working memory 204 can be a random access memory (RAM) such as a static random access memory (SRAM) or dynamic random access memory (DRAM), or any other suitable memory.

Input-output devices 206 can include any suitable device that allows for data input or output. For example, input-output devices 206 can include one or more of a keyboard, a touchpad, a mouse, a stylus, a touchscreen, a physical button, a speaker, a microphone, or any other suitable input or output device.

Communication port(s) 214 can include, for example, a serial port such as a universal asynchronous receiver/transmitter (UART) connection, a Universal Serial Bus (USB) connection, or any other suitable communication port or connection. In some examples, communication port(s) 214 allows for the programming of executable instructions in instruction memory 214. In some examples, communication port(s) 214 allow for the transfer (e.g., uploading or downloading) of data, such as user identification data and/or user device data.

Display 216 can display a user interface 218. User interfaces 218 can enable user interaction with the user speed determination device 102. For example, user interface 216 can be a user interface that allows an operator to interact, control and/or modify different parameters used to determine the user device speed. The user interface 218 can include a slider bar, dialogue box, or other input field that allows the operator to control or modify the predetermined threshold used to identify a slow user device that requires remediation. In addition, the user interface 218 can include one or more input fields or control that allow speed classifications to be control or modified. In some examples, an operator can interact with user interface 218 by engaging input-output devices 206. In some examples, display 216 can be a touchscreen, where user interface 218 is displayed on the touchscreen.

Transceiver 212 allows for communication with a network, such as the communication network 118 of FIG. 1. For example, if communication network 118 of FIG. 1 is a cellular network, transceiver 212 is configured to allow communications with the cellular network. In some examples, transceiver 212 is selected based on the type of communication network 118 user speed determination device 102 will be operating in. Processor(s) 202 is operable to receive data from, or send data to, a network, such as communication network 118 of FIG. 1, via transceiver 212.

Figure 3:
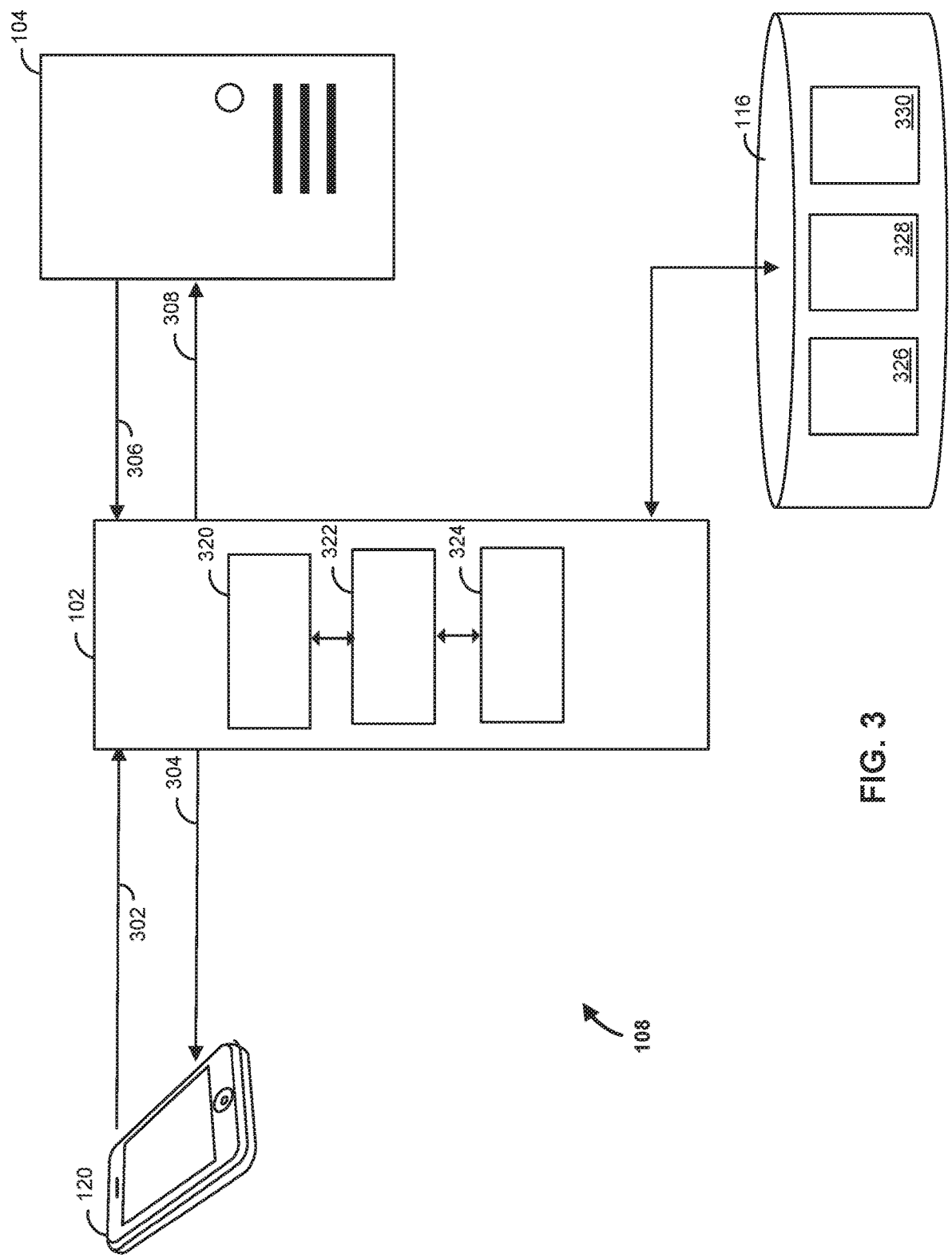
FIG. 3 is a block diagram illustrating an example user speed remediation system of the network system of FIG. 1 in accordance with some embodiments.

Turning to FIG. 3, an example user remediation system 108 can include the user speed determination device 102, a content delivery device 104 and a database 116. As shown, the user speed determination device 102 can be operatively coupled with the content delivery device 104 and the database 116. The user speed determination device 102, the content delivery device 104 and the database 116 can be in communication with each other via any suitable connection such as the network 118 (FIG. 1). In other examples, other local networks or connections can also be used.

The user speed determination device 102 can be operable to determine a user device speed and then cause the content delivery device 104 to deliver remediated content to the user device 120 if the user device 120 is determined to have a slow speed. By delivery of remediated content to the identified slow user device, the user may have an improved user experience than would otherwise be experienced if normal or standard content was delivered to the slow user device.

For purposes of the present disclosure, a slow user device is a device that is identified by one or more of the example systems or methods described herein as being unable to load the standard content of an application or website an acceptable period of time. Such a slow condition can be measured using any suitable metric. For example, a slow user device can be identified using an objective metric that measures the amount of time required to load content on the user device. Some example measures include Time-To-First-Byte (TTFB), Above-The-Fold (ATF), Time-To-Interactive (TTI), Load Time (LT) and Speed Index (SI). Generally speaking, Time-To-First-Byte (TTFB) measures the amount of time that it takes to load the first byte of content on a user device after a request to deliver the content has been sent by the user device. Above-The-Fold (ATF) measures the amount of time that it takes to load content that appears on a webpage (or other application) on a portion of the webpage that appears to a user without scrolling down. ATF generally means the time it takes to load content on a webpage that is interactable for the user although all content may not be loaded (e.g., advertisements or content on a lower portion of the webpage). Time-To-Interactive (TTI) measure the amount of time it takes to completely load all content on a webpage or application. Load Time (LT) generally measures the time until the load event fires at the end of the document loading process. After the load event, all of the object in the document are in the Document Object Model (DOM), and all the images, scripts, links and sub-frames have finished loading. The Speed Index (SI) generally measures the average time at which visible parts of the webpage are displayed. The SI can be expressed in milliseconds and can be dependent on the size of the view port. One or more of the measures described above can be used to identify a slow user device or can be used to measure performance improvements that result from implementation of the systems and methods of the present disclosure.

As can be appreciated, the above measures can identify slow user devices but may not useful in improving user experiences because by the time that the speed of the user device is determined using TTFB, ATF or TTI the user has already experienced an unacceptable wait time for content to be loaded on the user device. The systems and methods of the present disclosure, therefore, identify a slow user device using the user speed determination device 102 prior to the delivery of content to the user device 120 from the content delivery device 104. In such a manner, the user speed determination device 102 can identify a slow user device, send an indicator of a slow user device to the content delivery device 106 that, in turn, can deliver remediated content (rather than standard or normal content) to the user device 120. This can improve the user's experience on the website or application including the user's first experience with the website. The systems and methods of the present disclosure can predict and/or estimate the likelihood that the user device 120 is a slow user device and take appropriate actions (e.g., deliver remediated content) upon a first pageview rather than having to wait until a slow user device is measured and/or identified using TTFB, ATF or TTI.

Referring back to FIG. 3, the user device 120 can send a request 302 for content delivery that is received by the user speed determination system 102. Upon receipt of the request 302, the user speed determination device 102 can obtain user identification data and user device data that is used to determine whether the user device 120 is a slow user device or operates at normal speeds. The user identification data is data that includes information about the user and/or the user device. The user identification data can include an IP address and geolocation. In other examples, other user identification data can be used.

As stated above, the user speed determination device 102 can also obtain user device data. The user device data can include further information about the user and may include user agent data, user device performance data, user connection data and/or user resource timing data. The user agent data can include information about the application type, operating system, software vendor and software version that is being used on the user device 120. Such information can include, for example, the type of operating system that is running on the user device (e.g., Windows, Android, IOS, etc.). Other example information can include the type of browser being used (e.g., Safari, Chrome, FireFox, etc.). In other examples, the user identification data can include other types of information that can be obtained by the user speed determination device 102.

The user connection data may include information that describes the type of network that the user device 120 is current operating on. Such connection data can characterize whether the user device 120 is connected to the network via WiFi, cellular connection (3G, 4G, 5G) or other network characteristics. The connection data may further characterize the connection speed of the network to determine or characterize the speed of data transfer (i.e., cable, cellular, corporate). The user connection data may include user device type, user device make, user connection type and user connection location.

The user resource timing data can include information that characterizes the actual performance of the user device and the time and/or interaction of the user with the content that is loaded. The resource timing data may not be available upon a user's initial request for content delivery. Thus, the user speed determination device 102 may not use the resource timing data in an initial user device prediction and may use the resource timing data to update a prediction of the user device speed from a second pageview onwards. The resource timing data can include Real User Metric (RUM) data and RUM performance metrics. In other examples, the user device data can include other types of information that can be obtained by the user speed determination device 102.

The user identification data and the user device data can be historical data or real-time data that is stored and or collected by the user speed remediation system 108. For example, data storage 16 can be operatively coupled to the user speed determination device 102 and can include user identification data storage 326, user device data storage 328 and/or user historical data storage 330. The user identification data and the user device data can be obtained by a user identification data engine 322 and a user device data engine 324, respectively. The user identification data engine 322 and the user device data engine 324 can be an application or software package that reside locally or remotely from the user speed determination device 102. For example, the user identification data engine 322 can request user identification data by accessing and/or requesting such data from a browser on a user device 120 that may have requested content delivery. The user device data engine 324, for example, can be a RUM data package that collects information from the interaction of the user and/or the user device 120 with a website or other application.

In other examples, the user speed determination device 102 can be operatively connected to third-party service providers via the network 118 (FIG. 1). The service providers may provide the user identification data and/or the user device data via a web server (e.g., 106, 114, FIG. 1). The user speed determination device 102 can obtain such user identification data and/or user device data by requesting the information via an appropriate application programming interface (API), for example.

As further shown in FIG. 3, the user speed determination device 102 can include a user device speed data model 320. The user device speed data model 320 can be any suitable data model that can predict and/or identify a slow user device based on information that is available before content is delivered to the user device 120 by the content delivery device 104. In the example shown, the user device speed data model 320 can be a model that is based on the Spark ML Logistic Classifier. In other examples, other modeling packages or other regression models can also be used.

In the example, the user device speed data model 320 can be trained using Real User Metric (RUM) data that captures network speed and other device speed characteristics. This data can include actual performance data of user devices that accessed a website. The data can be analyzed and sorted to determine the slowest 40% of user devices that accessed the website. This portion of the data can be used to train the model. In one example, the data inputs for training the user device speed data model 320 can include: user agent data including, device type, browser type, browser version and operating system; connection type (e.g., WiFi or cellular); and IP address. The user device speed data model 320, after training with the foregoing data inputs and the RUM data, can predict a likelihood that the user device is a slow user device.

In one example, the user device speed data model 320 can determine a user device speed predictor such as a probability or other numerical value. This user device speed predictor can be compared with a predetermined threshold to categorize the user device as a slow user device or a normal user device. For example, the user device speed data model 320 can determine a probability that the user device is a slow user device and return a user device speed predictor as a value between 0 and 1. A predetermined threshold can be set at a value between 0 and 1 to designate a user device as a slow user device or a normal user device. In one example, the predetermined threshold is set at 0.8. In this example, when the user device speed data model 320 returns a user device speed predictor in the range of 0 to 0.79, the user device can be designated as a normal user device. When the user device speed data model 320 returns a user device speed predictor in the range of 0.80 to 1.0, the user device is designated as a slow user device. Depending on the circumstance and the desired effects on improvements to a user's experience on a website, it can be desirable to designate a larger group of user devices as slow devices than in other circumstances. In such circumstances, the predetermined threshold can be set at value less than 0.80. In still other examples, the predetermined threshold can have other values or ranges.

In other examples, the user device speed data model 320 may designate or classify a user device as a slow device using other methods. In an alternate example, the user device speed data model 320 may use the historical or actual data (such as the RUM data described above) that is used to train the model to create classifications into which a user device speed can be classified. For example, the historical or actual data may be used to divide user devices into one or more categories based on past performance. For example, the historical data may be used to determine the slowest 20% of user devices in terms of time to load content using the metrics TTFB, ATF or TTI. This slowest 20% of user devices can then be used to determine the appropriate predetermined threshold. As previously described, this value can then be adjusted, according to circumstances, to designate more or less devices as slow devices using the user device speed data model 320.

In still other examples, the predetermined threshold can be set at different values depending on the characteristics of the user device. For example, the predetermined threshold can be set at a higher value for user devices that are laptops or personal computers in comparison to user devices that are mobile phones or tablets. Some studies have shown that mobile users are more sensitive to slow loading applications and websites than are users operating laptops or personal computers.

Figure 4:
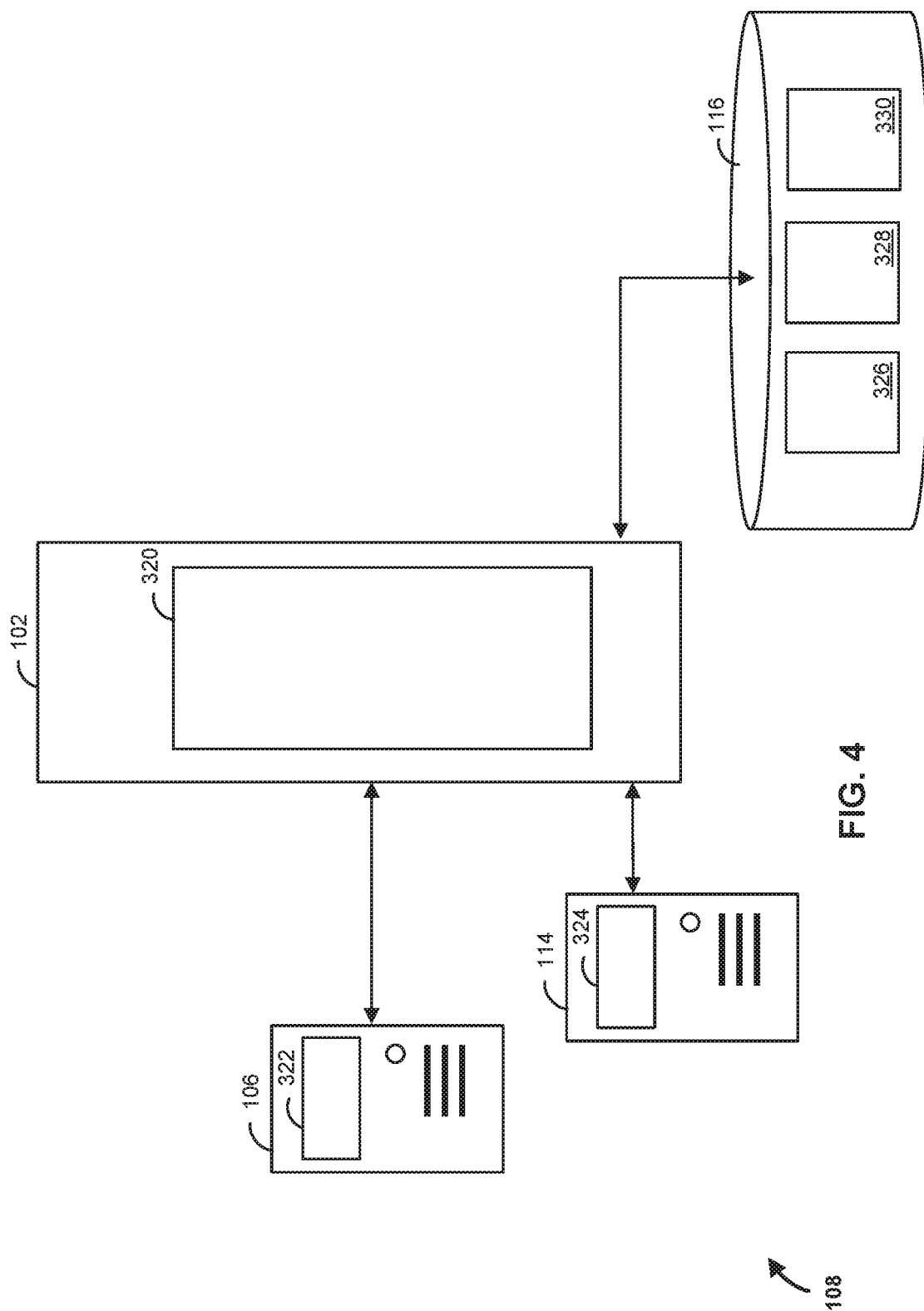
FIG. 4 is a block diagram illustrating another example user speed remediation system of the network system of FIG. 1 in accordance with some embodiments.

Referring now to FIG. 4, the user speed determination device 102 can be operatively connected to web servers 106, 114. The web servers 106, 114 can be operated by third parties and/or be located remote from the user speed determination device 102. The web server 106 can, for example, include the user identification data engine 322 and the web server 114 can include the user device data engine 324. The web servers 106, 114 can be in communication with the user speed determination device 102 and can provide user identification data and/or user device data to the user device speed data model 320.

In the examples above, the user device speed data model 320 is described as a regression model such as the Spark ML Logistic Classifier. In other examples, other regression models and packages can also be used. In still other examples, the user device speed data model 320 can use artificial intelligence (AI), machine learning, artificial neural networks or the like to develop the model that can predict whether the user device is slow user device.

After the user speed determination device 102 has determined whether a user device 120 is a slow user device or a normal user device using the user device speed data model 320. The user speed determination device 102 can send a user device speed indicator 308 to the content delivery device 104. If the user device speed indicator 308 indicates that the user device 120 is a slow user device, the content delivery device 104 can deliver remediated content to the user device 120, either directly or via the user speed determination device 102. Alternatively, if the user device speed indicator 308 indicates that the user device 120 is a normal device, the content delivery device 104 can deliver normal or standard content to the user device 120. In the example shown, the content delivery device 104 delivers content 306 to the user speed determination device 102 that, in turn, delivers the content 304 to the user device 120.

Figure 5:
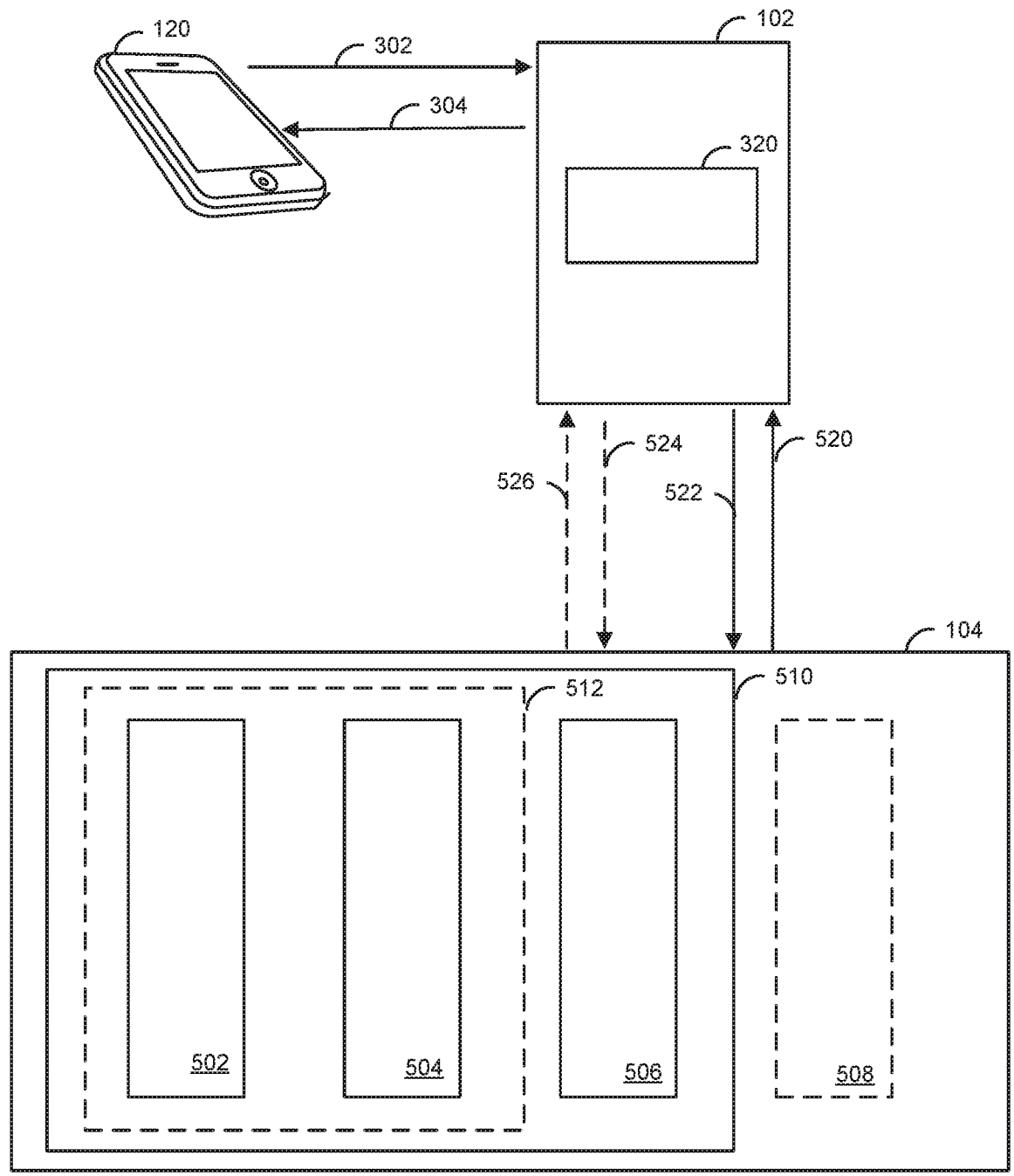
FIG. 5 is a block diagram illustrating examples of various portions of the network system of FIG. 1 in accordance with some embodiments.

This operation of the user speed determination device 102 is further detailed on FIG. 5. As shown, the user speed determination device 102 can receive a request 302 from the user device 120 for the delivery of content (e.g., a website). The user speed determination device 102 can determine and/or predict whether the user device 120 is a slow user device or a normal user device. If the user speed determination device 102 determines that the user device 120 is a slow device, the user speed determination device 102 sends a slow user device speed indicator 524 to the content delivery device 104. In return, the user speed determination device 102 receives remediated content 512 via signal 524 from the content delivery device 104. Alternatively, if the user speed determination device 102 determines that the user device 120 is a normal user device, the user speed determination device 102 sends a normal user device speed indicator 522 to the content delivery device 104. In return, the user speed determination device 102 receives normal content 510 via signal 520 from the content delivery device 104. The user speed determination device can then relay the remediated or normal content to the user device 120 via signal 304.

The difference between the remediated content and the normal content can vary depending on the website or the application. The normal or standard content is the content that is customarily delivered to the user device 120 when such content is requested. Normal or standard content can include text, images, advertising, video, sound, marketing tabs, and analytic scripts such as Tealeaf. As can be appreciated, high-definition images, videos, gifs, and some advertising content can have large file sizes that can be slower to deliver than other types of content such as text and simple images. The remediated content 512 can be a subset of the normal content 510 as shown. For example, the normal content may include text 502, images 504 and video 506. The remediated content 512 may include the text 502 and the image 504 but leave out the video 506. In an alternate example, the remediated content 512 may also include a simplified file 508. The simplified file 508, for example, may be a static image rather than the video 506. In this example, the remediated content 512 can include the text 502, images 504 and the simplified file 508 while still removing the video 506.

In another example, the remediated content is a speed profile bundle of content that removes display ads, marketing tags and analytic script from the normal content. Such removal of content from the normal content can result in different savings depending on the type of webpage. For example, a homepage may contain more display ads and marketing content than a search and browse page or an item page. As such, the removal of the display ads and marketing content from a homepage results in the remediated content for a homepage having a larger effect on file size than the removal of the display ads and marketing content from an item page.

While the examples discussed above include a system in which the user speed determination device determines whether the user device is either a slow user device or a normal user device, in other examples, the user speed determination device can operate to classify or categorize the user device into three or more different classifications or designations. In such examples, the content to be delivered to the user device can also be classified into three or more categories of content. For example, the user speed determination device, using the teaching and principles discussed above, can determine whether the user device is a slow user device, medium user device or fast user device. In such an example, the content delivery device can deliver a slow speed content, medium speed content or fast speed content to the slow user device, medium user device or fast user device respectively.

Figure 6:
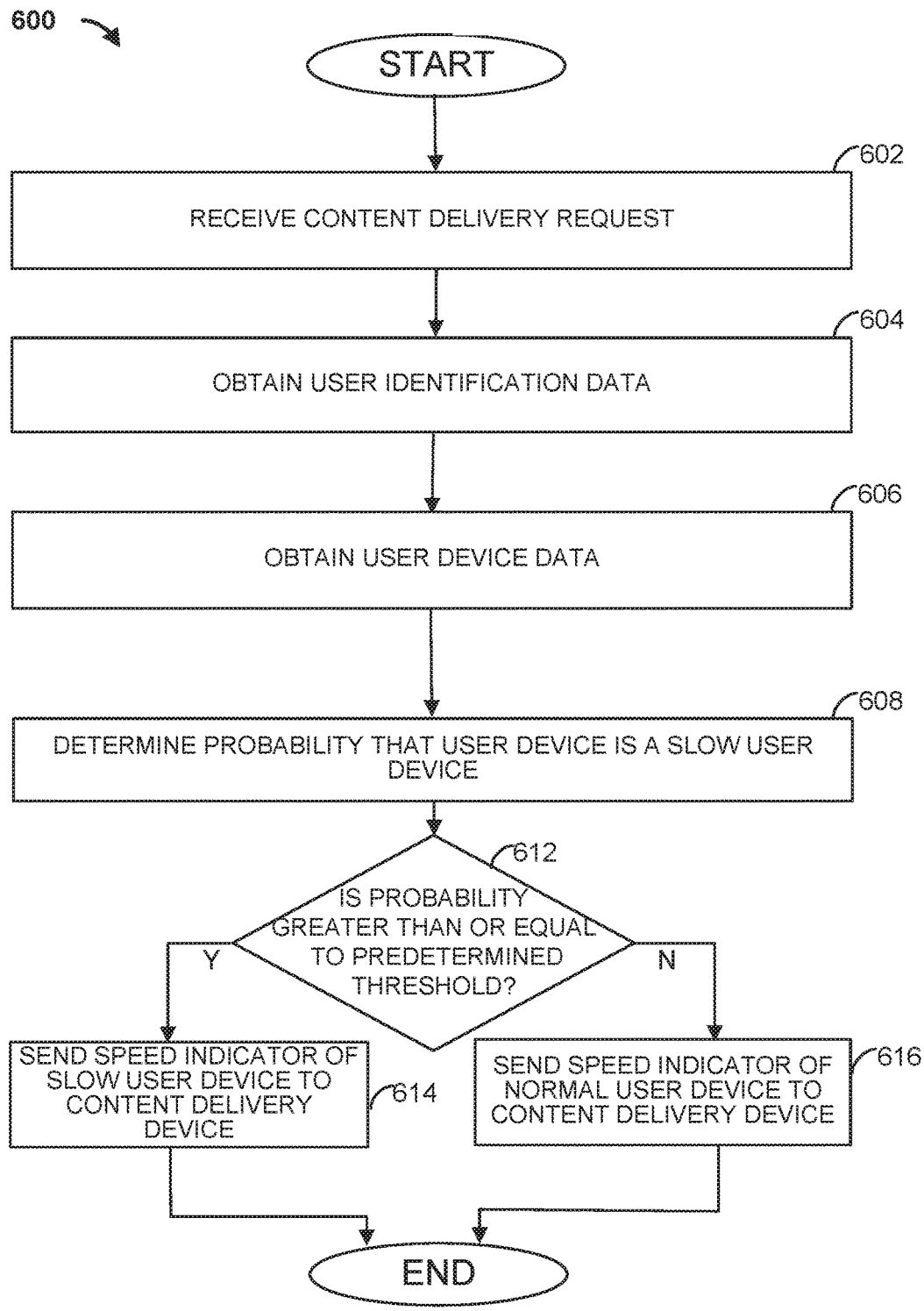
FIG. 6 is a flowchart of an example method that can be carried out by the user speed remediation system of FIG. 3 or FIG. 4 in accordance with some embodiments.

Turning now to FIG. 6, an example method 600 of the present disclosure is presented. As step 602, the user speed determination device 102 can receive a content delivery request from a user device 120. For example, a user may enter a website address or click on a website link. Such action by the user can cause the content delivery request to be sent and then received by the user speed determination device 102.

At step 604, the user speed determination device 102 can obtain user identification data. The user identification data can include an IP address, geolocation, or other data identifying the user device 120.

At step 606, the user speed determination device 102 can obtain user device data. The user device data may include user agent data and/or connection data. Examples of user device data includes device type, device make, user connection type, user connection location, operating system, browser type, browser version, RUM resource timing data and RUM performance data. As discussed above, the RUM resource timing data and RUM performance data may not be obtained or used in an initial determination of user device speed. On second and subsequent page views, the RUM resource timing data and/or RUM performance data may be obtained and used in the determination of the user device speed.

At step 608, the user speed determination device 102 can determine a user device speed of the user device 120 based on the user identification data and the user device data. The user speed determination device 102 can, for example, apply the user identification data and the user device data to the user device speed data model 320 as described above. As a result, the user speed determination device 102 can predict, classify or determine whether the user device 120 is a slow user device.

At step 612, the user speed determination device 102 can compare the determined user device speed to a predetermined threshold. If the user device speed is less than the predetermined threshold, the user speed determination device 102 can designate the user device as a slow user device. In some examples, the user speed determination device 102 does not determine a speed but instead can determine another metric that indicates the likelihood that the user device 120 is a slow user device. For example and as shown in FIG. 6, the user speed determination device 102 can determine a probability that the user device 120 is a slow user device. At step 612, if the determined probability is greater than (or equal to) the predetermined probability threshold, the user device 120 is designated as a slow user device. Upon such designation, a speed indicator can be sent to the content delivery device 104. If the determined probability is less than the predetermined threshold, the user device 120 is designated as a normal user device. Upon such designation, a speed indicator of a normal user device can be sent to the content delivery device 104.

While the example method 600 is shown as ending after either step 614 or step 616, the user speed determination device 102 can then receive either remediated content or normal content from the content delivery device 104 that is then delivered to the user device 120.

Figure 7:
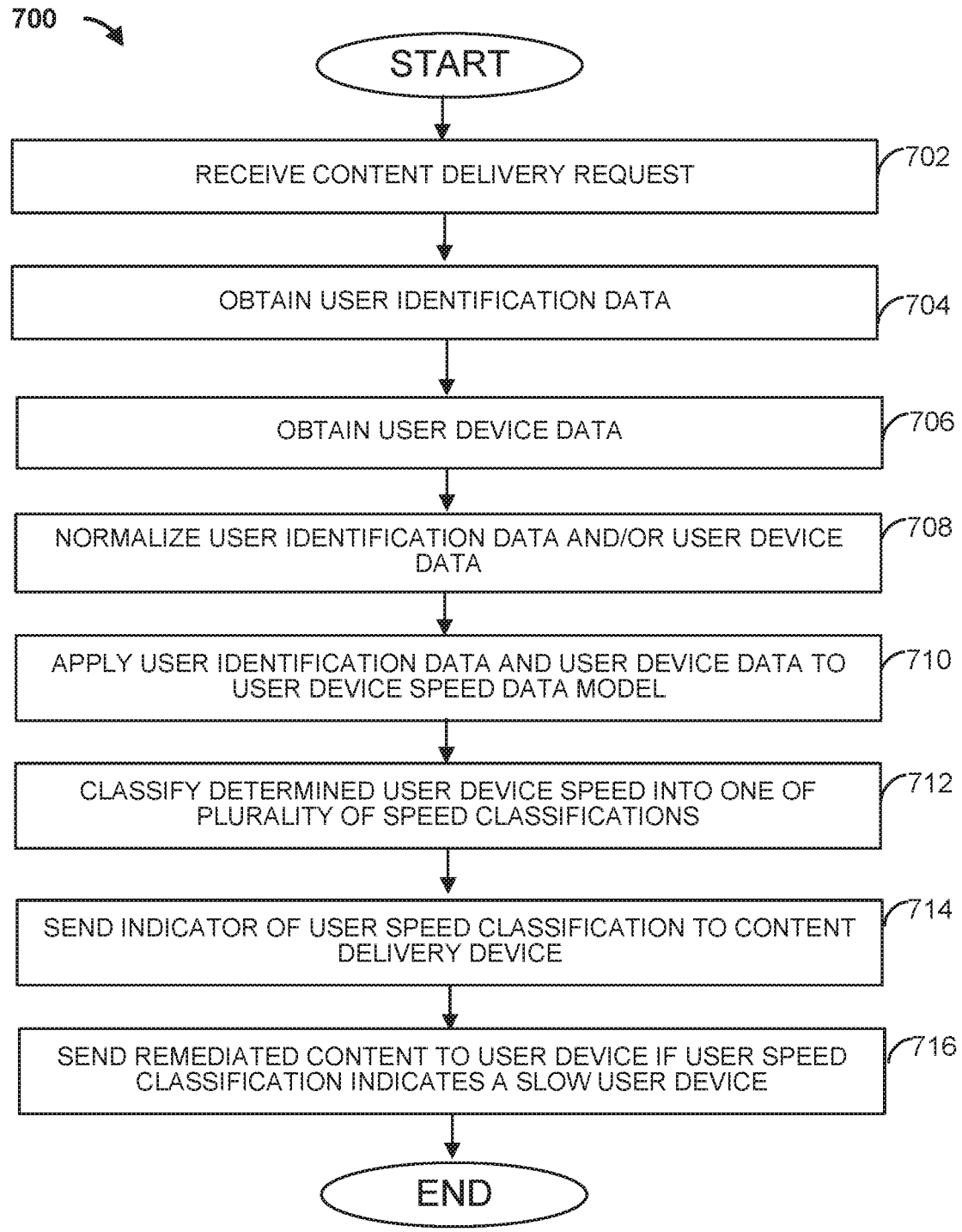
FIG. 7 is a flowchart of another example method that can be carried out by the user speed remediation system of FIG. 3 or FIG. 4 in accordance with some embodiments.

Another example method is presented in FIG. 7. Method 700 begins at step 702 in which a content delivery request is received by the user speed determination device 102. At step 704, the user speed determination device 102 obtains user identification data and at step 706 the user speed determination device 102 obtains user device data. Steps 702, 704 and 706 are substantially similar to steps 602, 604, and 606 previously described.

At step 708, the user speed determination device 102 can normalize the user identification data and/or the user device data. The user speed determination device 102 can normalize the data so that the subsequent application of the user identification data and/or the user device data to the user device speed data model 320 results in an effective and/or accurate determination and/or classification of the user device speed. As can be appreciated, the time required to load different webpages can widely differ depending on the amount of content that may appear on a webpage. Therefore, the direct comparison between load times of different pages may not be an effective way to compare user devices unless the load times are normalized by, for example, the amount of content that is being loaded during time frame. Other data may also need to be normalized before it can be effectively used by the user device speed data model 320 at step 710. As can be further appreciated, such normalization may also be completed prior to training the user device speed data model 320 during creation and training of the user device speed data model previously described. Any suitable method or technique for the normalizing or standardizing of the data can be used.

At step 710, the user speed determination device 102 can apply the user identification and the user device data to the user device speed data model 320. The data model can predict, determine and/or classify the user device as previously described.

At step 712, the user speed determination device 102 can classify the determined user device speed into one or more speed classifications. For example, the user device speed data model 320 may determine a probability that the user device 120 is a slow user device. The user speed determination device 102 may classify the determined user speed into one of several categories.

At step 714, the user speed determination device 102 can send a speed indicator to the content delivery device 104 that indicates which of the classifications that the user device 120 has been designated.

At step 716, the remediated content can be sent to the user device 120 by either the user speed determination device 102 or by the content delivery device 104. Such remediated content can be sent to the user device 120 when the user device 120 is classified into a slow user device classification. In other instances, normal content or different levels of remediated content can be sent to the user device 120 depending on which classification of the multiple classifications that the user device 120 has been classified into.

The example methods 600 and 700 can be performed when a user first seeks to open a website or application by sending the content delivery request to the user speed determination device 102 (i.e., opening a browser or clicking a link). Once designated or classified as a slow or normal user device, the user speed determination device can repeatedly perform the methods described in the present to disclosure to determine if the user should be re-classified or changed from a slower user device to a normal user device or vice versa. Such repeated performance of the methods can occur on a period basis (e.g., every 30 minutes) or can be performed upon each action or each pageview by a user. In this way, the normal content can be presented to a user if a user's connection speed improves or, in the alternative, the remediated content can be presented if a user leaves a high-speed connection or the speed of the user's device is reduced during an interactive session with the website or application.

The systems and methods of present disclosure were implemented and tested to determine improvement over delivery of content on a website using current delivery methods. In the test, a user device speed data model was trained for use in connection with a retail website that includes various pages such as a home page, a search results page, an item listing page and a cart page. The user speed remediation system (such as user speed remediation system 108) was tested for two months and user's interactions were recorded. The improvements in Above-The-Fold (ATF), Load Time, Speed Index and Time-To-Interactive (TTI) are shown in Table 1 below.

TABLE 1

Performance Improvements

| Page Type | ATF | Load Time | Speed Index | TTI |
|---|---|---|---|---|
| Home Page | 2% | 10% | 48% | 36% |
| Search Page | 9% | 9% | 39% | 33% |
| Item Listing Page | 2% | 2% | 21% | 26% |
| Cart Page | 2% | 7% | 19% | 21% |

As can be seen, the test example showed significant improvement in all performance measures. The improvements in Time-To-Interactive are particularly significant. The systems and methods of the present disclosure provide demonstrable improvements over existing systems and methods. The present disclosure provides systems and methods that can model various aspects of a user device other than connection speed and device type. While many websites may offer mobile and standard versions, the systems and methods of the present disclosure can model and identify slow user devices that contribute to poor user experiences that existing methods are unable to identify. In addition, the systems and methods of the present disclosure can identify such slow user devices before content is delivered to the user device. In this way, the remediated content can be delivered upon first interaction with the user device to prevent a user from terminating the session or having a negative experience with the website or application.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
a computing device configured to:
receive a content delivery request for delivery of content to a user device;
obtain user identification data;
obtain user device data;
determine user device speed based on the user identification data and the user device data by applying the user identification data and the user device data to a user device speed data model that is configured to classify a determined user speed of the user device into one of a plurality of speed classifications; and
send a user device speed indicator to a content delivery device to cause the content delivery device to deliver remediated content to the user device when the user device speed is determined to be less than a predetermined speed threshold.

2. The system of claim 1, wherein the user identification data comprises an IP address and user agent data.

3. The system of claim 2, wherein the user agent data comprises at least one of application type of the user device, an operating system of the user device, an application author of the user device, and an application version of the user device.

4. The system of claim 1, wherein the user device data comprises user connection data and user resource timing data.

5. The system of claim 4, wherein the user connection data comprises at least one of user device type, user device make, user connection type, and user connection location.

6. The system of claim 1, wherein the computing device is further configured to normalize the user identification data or the user device prior to determining the user device speed.

7. The system of claim 1, wherein the computing device is configured to send the user device speed indicator to the content delivery device prior to delivery of content to the user device.

8. The system of claim 1, wherein the computing device is further configured to determine a second user device speed based on the user identification data and the user device data after the user device speed indicator is sent to the content delivery device.

9. The system of claim 1, wherein the computing device is further configured to determine a user experience performance metric and to modify the predetermined speed threshold based on the user experience performance metric.

10. A method comprising:
  receiving a content delivery request for delivery of content to a user device;
  obtaining user identification data;
  obtaining user device data;
  determining user device speed based on the user identification data and the user device data by applying the user identification data and the user device data to a user device speed data model that is configured to classify a determined user speed of the user device into one of a plurality of speed classifications; and
  sending a user device speed indicator to a content delivery device to cause the content delivery device to deliver remediated content to the user device when the user device speed is determined to be less than a predetermined speed threshold.

11. The method of claim 10, wherein the user identification data comprises an IP address or geolocation.

12. The system of claim 11, wherein the user agent data comprises at least one of application type of the user device, an operating system of the user device, an application author of the user device, and an application version of the user device.

13. The system of claim 10, wherein the user device data comprises user connection data and user resource timing data.

14. The system of claim 13, wherein the user connection data comprises at least one of user device type, user device make, user connection type, and user connection location.

15. A non-transitory computer readable medium having instructions stored thereon, wherein the instructions, when executed by at least one processor, cause a device to perform operations comprising:
  receiving a content delivery request for delivery of content to a user device;
  obtaining user identification data;
  obtaining user device data;
  determining user device speed based on the user identification data and the user device data by applying the user identification data and the user device data to a user device speed data model that is configured to classify a determined user speed of the user device into one of a plurality of speed classifications; and
  sending a user device speed indicator to a content delivery device to cause the content delivery device to deliver remediated content to the user device when the user device speed is determined to be less than a predetermined speed threshold.

16. The non-transitory computer readable medium of claim 15, wherein the user identification data comprises an IP address or geolocation.

17. The non-transitory computer readable medium of claim 15, wherein the user device data comprises user connection data and user resource timing data.

* * * * *